US011112287B2

(12) United States Patent
Ishitsuka et al.

(10) Patent No.: US 11,112,287 B2
(45) Date of Patent: Sep. 7, 2021

(54) PHYSICAL QUANTITY MEASUREMENT DEVICE

(71) Applicant: HITACHI AUTOMOTIVE SYSTEMS, LTD., Hitachinaka (JP)

(72) Inventors: Norio Ishitsuka, Tokyo (JP); Takayuki Yogo, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/763,663

(22) PCT Filed: Jan. 31, 2019

(86) PCT No.: PCT/JP2019/003291
§ 371 (c)(1),
(2) Date: May 13, 2020

(87) PCT Pub. No.: WO2019/171837
PCT Pub. Date: Sep. 12, 2019

(65) Prior Publication Data
US 2020/0363247 A1 Nov. 19, 2020

(30) Foreign Application Priority Data

Mar. 9, 2018 (JP) .............................. JP2018-042549

(51) Int. Cl.
*G01F 1/684* (2006.01)
*G01L 19/14* (2006.01)

(52) U.S. Cl.
CPC .............. *G01F 1/684* (2013.01); *G01L 19/14* (2013.01)

(58) Field of Classification Search
None
See application file for complete search history.

(56) References Cited

U.S. PATENT DOCUMENTS 9,404,975 B2 * 8/2016 Kudo ...................... B60L 7/14
2018/0188084 A1 7/2018 Yogo et al.

FOREIGN PATENT DOCUMENTS

JP 2017-150929 A 8/2017
WO 2017/056694 A1 4/2017

* cited by examiner

*Primary Examiner* — Lisa M Caputo
*Assistant Examiner* — Nigel H Plumb
(74) *Attorney, Agent, or Firm* — Volpe Koenig (57) ABSTRACT

A device which measures a physical quantity of a gas flowing through a main passage is described. The device includes a flange for fixing to the main passage; a housing that protrudes toward an inside of the main passage from the flange; and a printed circuit board fixed to the housing on which a measuring element that measures the physical quantity is mounted. Wiring of the printed circuit board has a plurality of irregularities formed along one direction of a surface, and the wiring is arranged such that a formation direction of the irregularities is oriented along a protruding direction of the housing toward an inside of the main passage. The irregularities may be polishing marks formed using a cylindrical polishing wheel or rolling marks of the wiring of the printed circuit board.

12 Claims, 10 Drawing Sheets

PHYSICAL QUANTITY MEASUREMENT DEVICE

TECHNICAL FIELD

The present disclosure relates to a physical quantity measurement device of intake air of an internal combustion engine.

BACKGROUND ART

Conventionally, an invention relating to a physical quantity measurement device of intake air of an internal combustion engine has been known (see PTL 1 below). The physical quantity measurement device described in PTL 1 includes a circuit board having an insulating film formed on an outer surface of a board body and a housing in which the circuit board is insert-molded (see the same document, claim 1 and the like).

The circuit board includes: a fixing portion fixed to the housing; a pressing portion against which a mold for molding the housing is pressed; a conductor arrangement portion where a circuit conductor is arranged; and a boundary portion formed between at least one of the fixing portion and the pressing portion and the conductor arrangement portion.

The insulating film has a first region arranged on the fixing portion, a second region arranged on the pressing portion, a third region arranged on the conductor arrangement portion, and a fourth region arranged at the boundary portion, and has a film thickness different between the first region and the second region, and the fourth region.

CITATION LIST

Patent Literature

PTL 1: JP 2017-150929 A

SUMMARY OF INVENTION

Technical Problem

According to the conventional physical quantity measurement device, an excellent effect that it is possible to reduce corrosion of the circuit conductor of the circuit board caused by damage of the insulating film can be exhibited. Such a physical quantity measurement device is installed so as to protrude toward an inside of a main passage from a wall surface of the main passage through which intake air, which is a measurement target for a physical quantity, flows.

That is, the conventional physical quantity measurement device is in a cantilevered state in which one end is supported by the wall of the main passage of the intake air and the other end is a free end. For this reason, the physical quantity measurement device vibrates under the influence of, for example, rotation of an internal combustion engine, and the housing warps, so that stress acts on the circuit board. Therefore, when a printed circuit board is used as the circuit board of the physical quantity measurement device, it is important to take measures to suppress breakage of a wiring caused by the stress acting on the circuit board.

The present disclosure provides a physical quantity measurement device capable of suppressing breakage of a wiring of a printed circuit board.

Solution to Problem

One aspect of the present disclosure is a physical quantity measurement device which measures a physical quantity of a gas flowing through a main passage. The physical quantity measurement device includes: a flange for fixing to the main passage; a housing provided so as to protrude toward an inside of the main passage from the flange; and a printed circuit board which is fixed to the housing and on which a measuring element that measures the physical quantity is mounted. A wiring of the printed circuit board has a plurality of irregularities formed along one direction of a surface, and is arranged such that a formation direction the irregularities is oriented along a protruding direction of the housing toward the inside of the main passage.

Advantageous Effects of Invention

According to the above-described one aspect of the present disclosure, it is possible to provide the physical quantity measurement device capable of suppressing the breakage of the wiring of the printed circuit board.

DESCRIPTION OF EMBODIMENT

Hereinafter, an embodiment of a physical quantity measurement device according to the present disclosure will be described with reference to the drawings.

Figure 1:
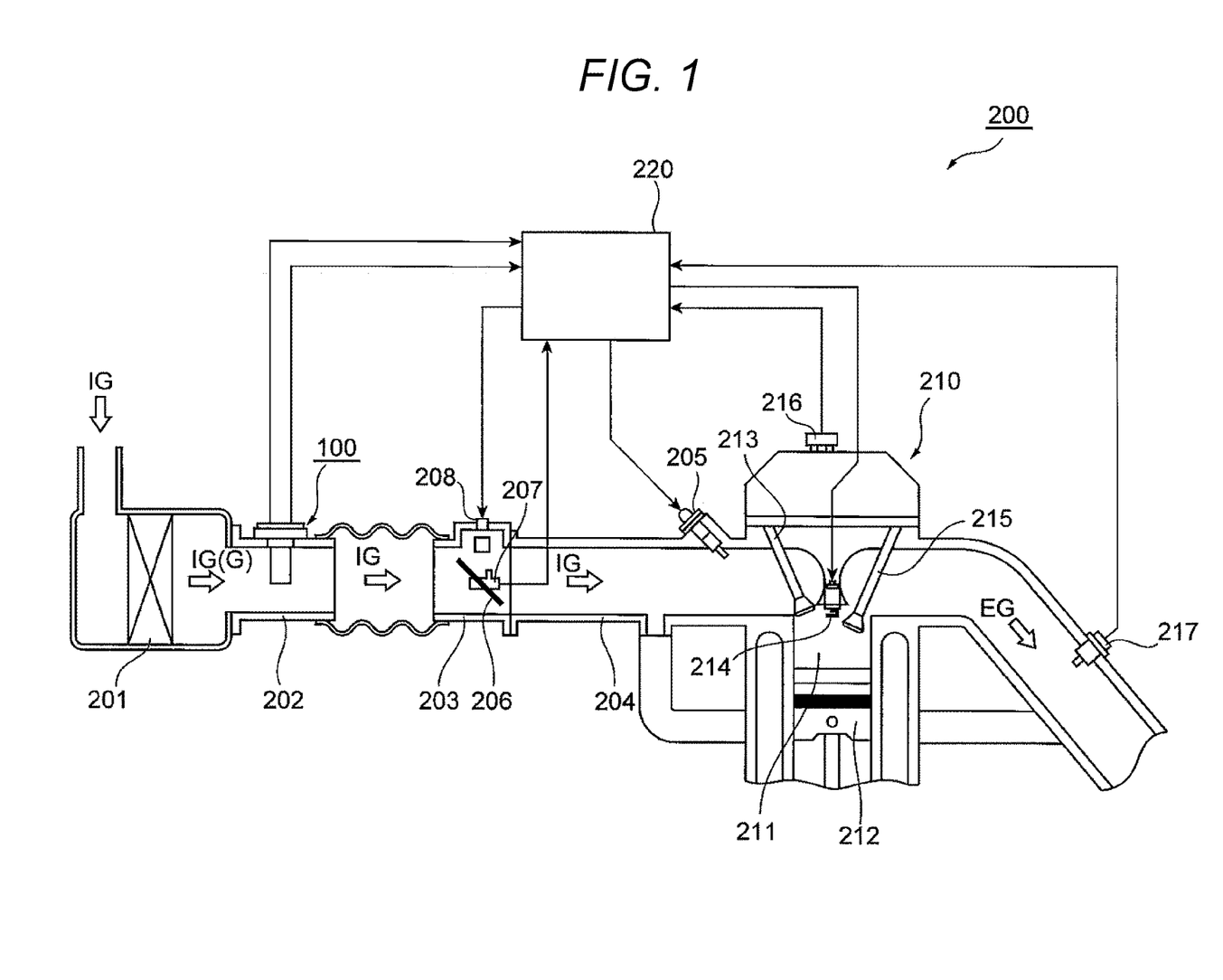
FIG. 1 is a schematic diagram illustrating an example of a control system of an internal combustion engine.

FIG. 1 is a schematic diagram illustrating an example of a control system 200 of an internal combustion engine 210 including a physical quantity measurement device 100 according to the embodiment of the present disclosure. In the control system 200, intake air IG, which is a gas G to be measured of the physical quantity measurement device 100, is sucked from an air cleaner 201 based on an operation of the internal combustion engine 210 including an engine cylinder 211 and an engine piston 212, and is guided to a combustion chamber of the engine cylinder 211 via, for example, a main passage 202 as an intake pipe, a throttle body 203, and an intake manifold 204.

A physical quantity of the intake air IG guided to the combustion chamber is measured by the physical quantity measurement device 100, fuel is supplied by a fuel injection valve 205 based on the measured physical quantity, and is guided to the combustion chamber in a state of an air-fuel mixture with the intake air IG. Incidentally, the fuel injection valve 205 is provided, for example, at an intake port of the internal combustion engine 210, and the fuel injected into the intake port is mixed with the intake air IG to form the air-fuel mixture. The air-fuel mixture is guided to the combustion chamber via an intake valve 213 and is burnt to generate mechanical energy.

The physical quantity measurement device 100 can be used not only in the scheme of injecting fuel to the intake port of the internal combustion engine 210 illustrated in FIG. 1 but also in a scheme of directly injecting fuel into each combustion chamber. Both the schemes have substantially the common basic concepts of a method of measuring a control parameter including a method of using the physical quantity measurement device 100 and a method of controlling an internal combustion engine including the supply amount of fuel and an ignition timing. FIG. 1 illustrates the scheme of injecting fuel into the intake port as a representative example of both the schemes.

The fuel and air guided to the combustion chamber are in the mixed state of fuel and air, and is explosively burnt by spark ignition of a spark plug 214, thereby generating the mechanical energy. After burning, the gas after burning is guided into an exhaust pipe from an exhaust valve 215, and is discharged, as exhaust EG, outside a car from the exhaust pipe. A flow rate of the intake air IG guided to the combustion chamber is controlled by a throttle valve 206 whose opening degree is changed based on an operation of an accelerator pedal. A supply amount of fuel is controlled based on the flow rate of the intake air IG guided to the combustion chamber, and a driver can control the mechanical energy generated by the internal combustion engine 210 by controlling the opening degree of the throttle valve 206 and controlling the flow rate of the intake air IG guided to the combustion chamber.

The gas G to be measured, which is the intake air IG taken in from the air cleaner 201, flows through the main passage 202, and the physical quantity measurement device 100 measures a physical quantity of the gas G to be measured, such as a flow rate, a temperature, humidity, and pressure. The physical quantity measurement device 100 is, for example, inserted into an inside of the main passage 202 from an insertion opening open in a wall of the main passage 202 to protrude from the wall of the main passage 202 toward an inside of the main passage 202. That is, the physical quantity measurement device 100 is supported by the wall of the main passage 202 in a cantilevered manner such that one end is a fixed end fixed to the wall of the main passage 202 and the other end is a free end arranged in the main passage 202.

An electric signal representing the physical quantity of the intake air IG measured by the physical quantity measurement device 100 is output from the physical quantity measurement device 100 and input to a control device 220. Further, the output of a throttle angle sensor 207 that measures the opening degree of the throttle valve 206 is input to the control device 220. Further, the output of a rotation angle sensor 216 is input to the control device 220 in order to measure positions and states of the engine piston 212, the intake valve 213, and an exhaust valve 215 of the internal combustion engine 210, and further, a rotation speed of the internal combustion engine 210. An output of an oxygen sensor 217 is input to the control device 220 in order to measure a state of a mixing ratio between the amount of fuel and the amount of air based on the state of the exhaust EG.

The control device 220 computes a fuel injection amount and an ignition timing on the basis of the physical quantity of the intake air IG as the output of the physical quantity measurement device 100 and the rotation speed of the internal combustion engine 210 which is the output of the rotation angle sensor 216. The fuel amount to be supplied from the fuel injection valve 205 and the ignition timing ignited by the spark plug 214 are controlled based on these calculation results. In practice, the supply amount of fuel and the ignition timing are controlled based on the temperature of intake air measured by the physical quantity measurement device 100, a change state of a throttle angle, a change state of the engine rotation speed, a state of an air-fuel ratio measured by the oxygen sensor 217. The control device 220 further controls the amount of air bypassing the throttle valve 206 using an idle air control valve 208 in an idle operation state of the internal combustion engine 210 and controls the rotation speed of the internal combustion engine 210 in the idle operation state.

Both the supply amount of fuel and the ignition timing, which are major control variables of the internal combustion engine 210, are computed using the output of the physical quantity measurement device 100 as the main parameter. Accordingly, improvement of measurement accuracy of the physical quantity measurement device 100, suppression of a change over time, and improvement of reliability are important in regard to improvement of control accuracy of a vehicle and securing of the reliability. From the viewpoint of improving the reliability of the physical quantity measurement device 100, it is also important that the physical quantity measurement device 100 has high durability.

Figure 2:
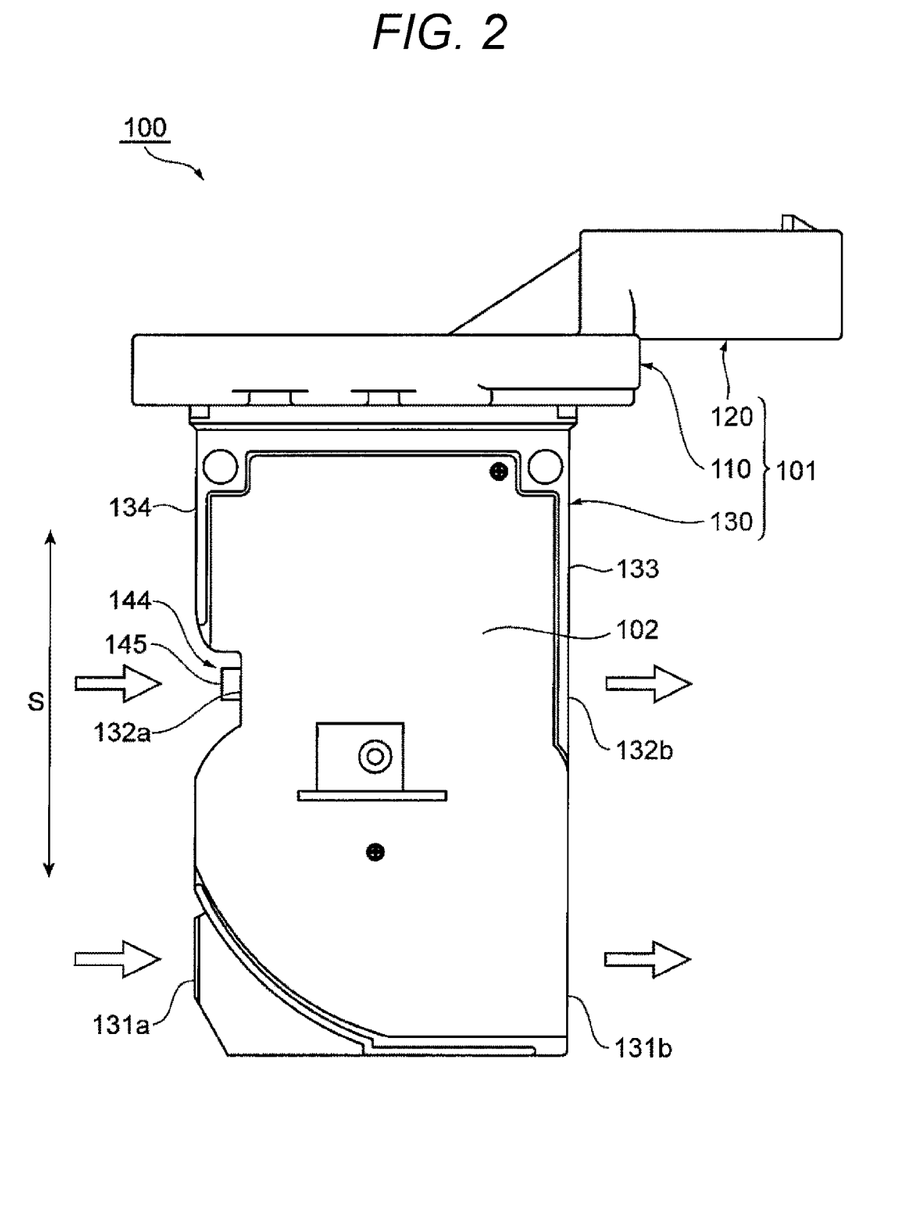
FIG. 2 is a front view of a physical quantity measurement device of the control system illustrated in FIG. 1.
Figure 3:
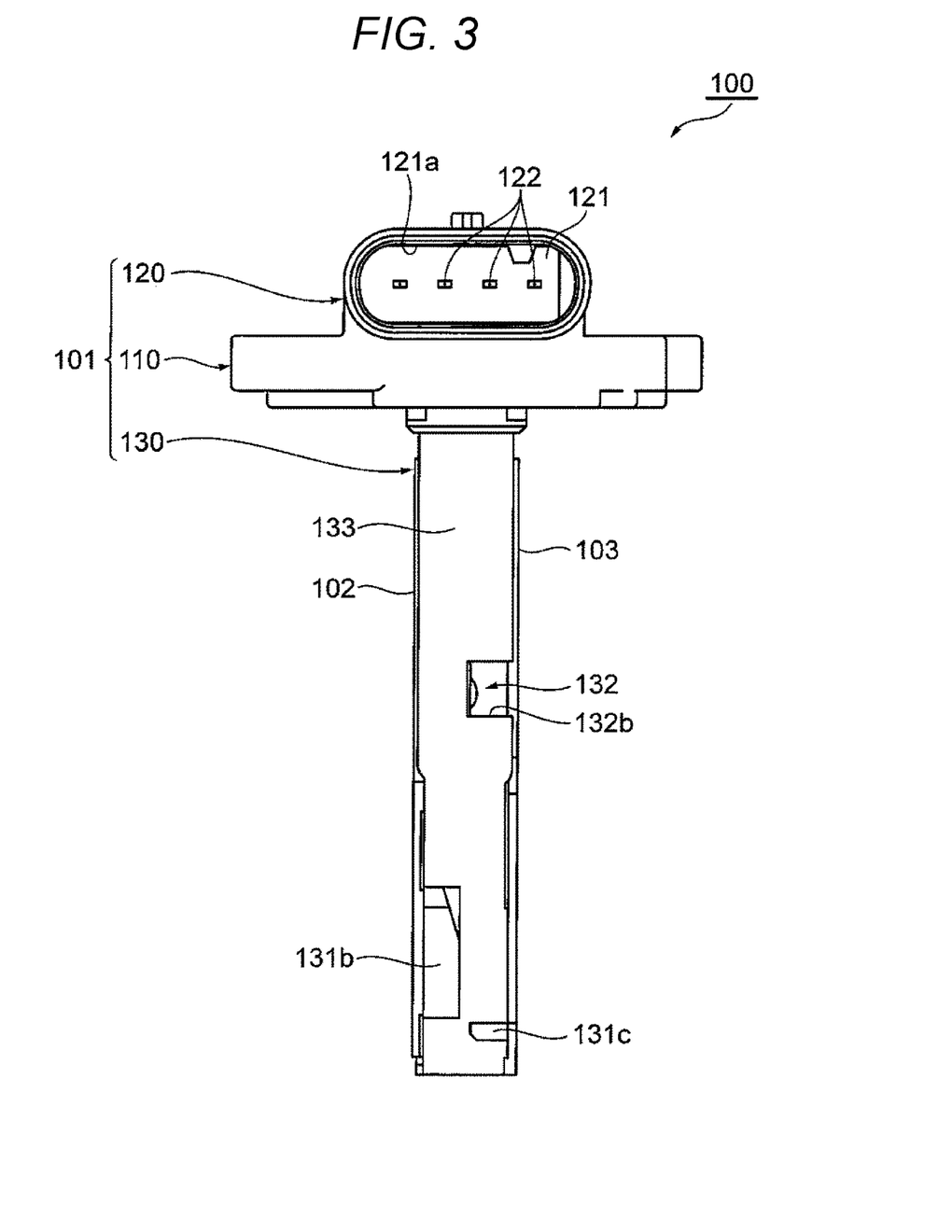
FIG. 3 is a right side view of the physical quantity measurement device illustrated in FIG. 2.
Figure 4:
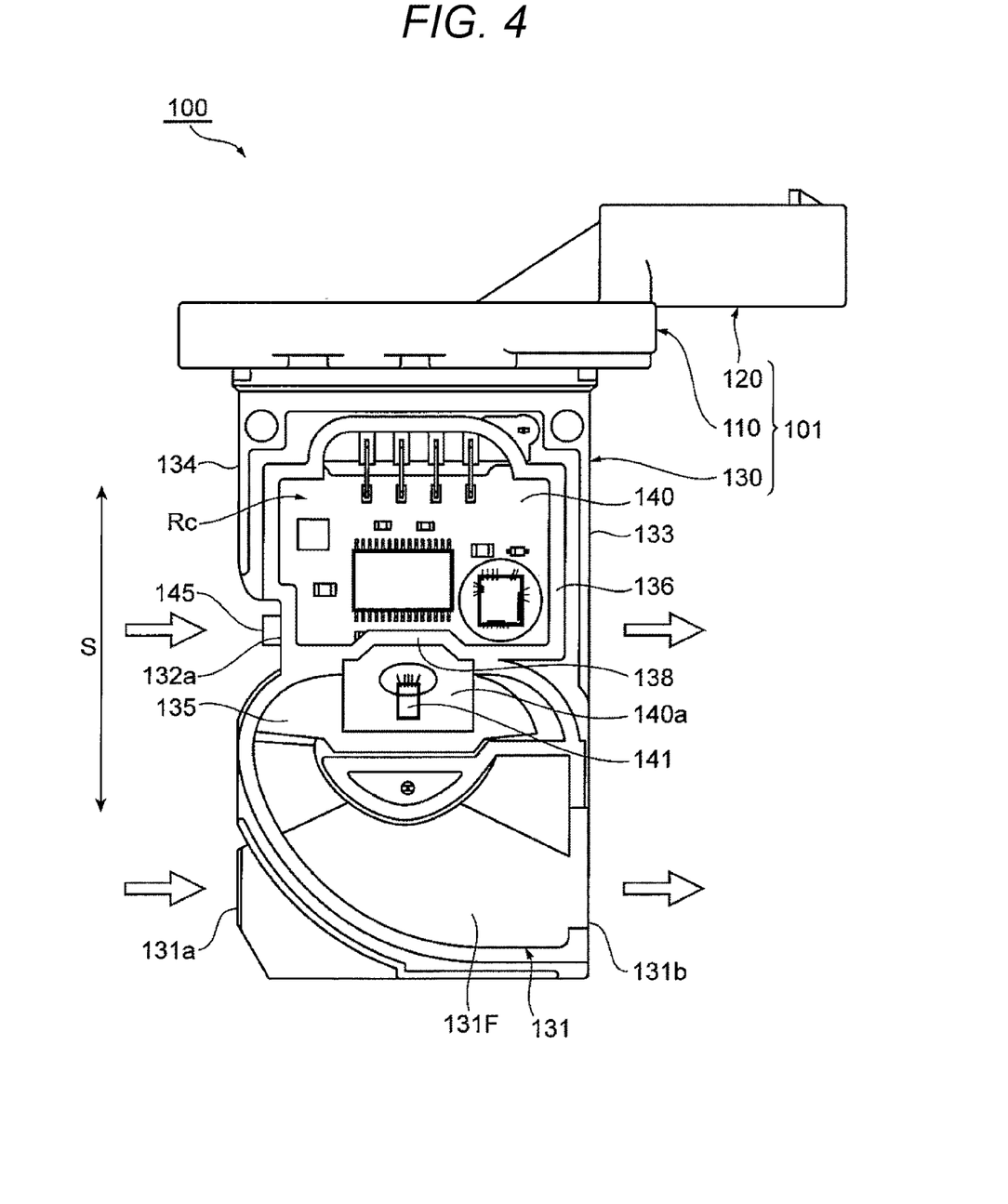
FIG. 4 is a front view illustrating a state where a front cover of the physical quantity measurement device illustrated in FIG. 2 has been removed.
Figure 5:
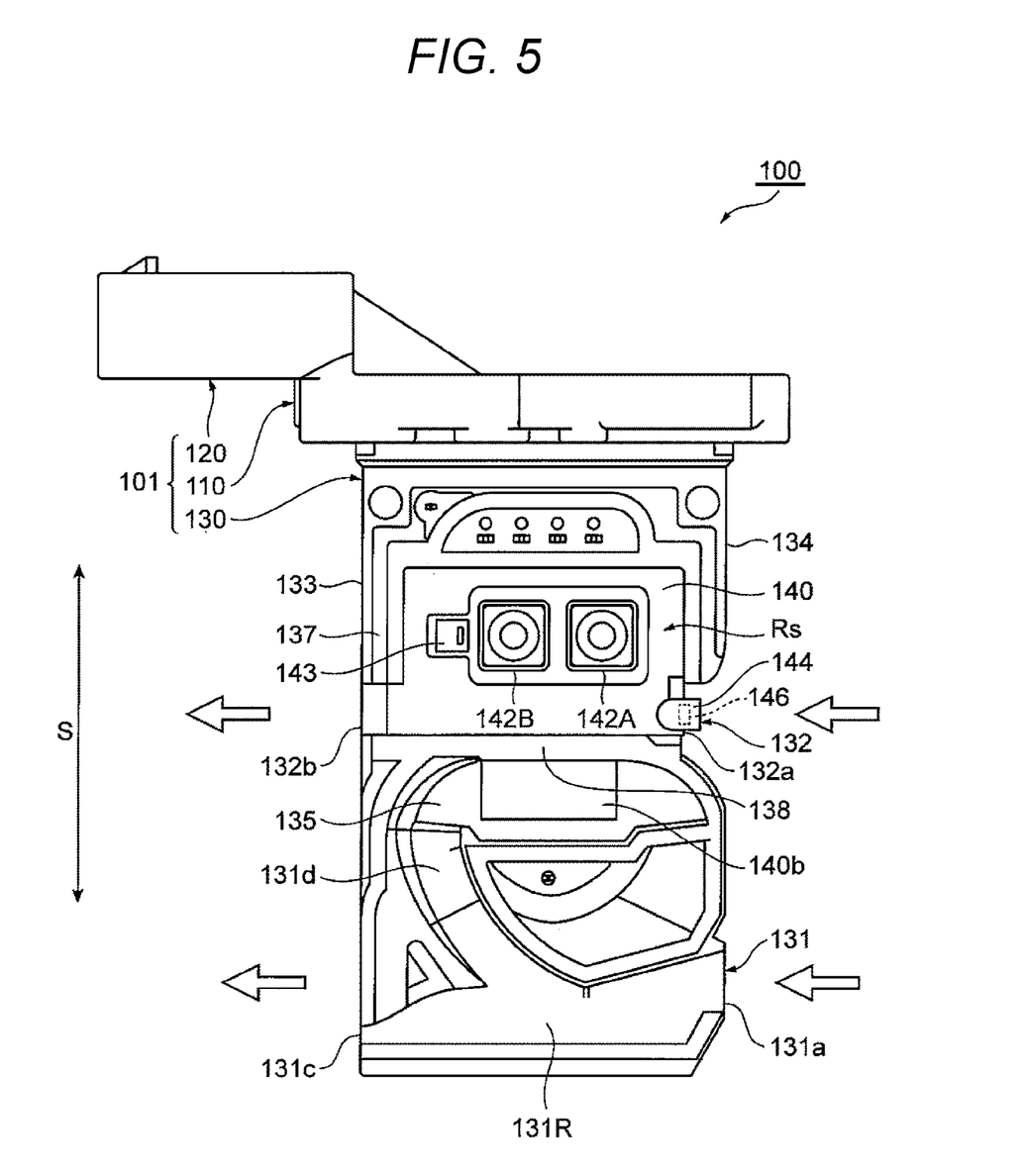
FIG. 5 is a back view illustrating a state where a rear cover of the physical quantity measurement device illustrated in FIG. 2 has been removed.

FIG. 2 is a front view of the physical quantity measurement device 100 illustrated in FIG. 1. FIG. 3 is a right side view of the physical quantity measurement device 100 illustrated in FIG. 2. FIG. 4 is a front view illustrating a state where a front cover 102 of the physical quantity measurement device 100 illustrated in FIG. 2 has been removed. FIG. 5 is a back view illustrating a state where a rear cover 103 of the physical quantity measurement device 100 illustrated in FIG. 2 has been removed.

Although details will be described later, the physical quantity measurement device 100 of the present embodiment is a device that measures the physical quantity of the gas G to be measured flowing through the main passage 202, and has the following configurations as the main features. The physical quantity measurement device 100 includes: a housing 101 that is arranged to protrude from the wall of the main passage 202 toward the inside of the main passage 202; and a printed circuit board 140 which is insert-molded in the housing 101 and on which a measuring element that measures a physical quantity is mounted. The measuring element may have a configuration in which a control circuit is formed integrally or a configuration in which a control circuit is formed separately. The printed circuit board 140 has a plurality of irregularities F (see FIGS. 6A and 6B) formed along one direction of a surface. In the physical quantity measurement device 100, the printed circuit board 140 is arranged such that a formation direction of the irregularities F is oriented along a protruding direction of the housing 101 toward the inside of the main passage 202. Hereinafter, each configuration of the physical quantity measurement device 100 of the present embodiment will be described in detail.

As illustrated in FIGS. 2 and 3, the physical quantity measurement device 100 includes the housing 101, the front cover 102, and the rear cover 103.

The housing 101 is formed, for example, by molding a resin material using a mold. The housing 101 includes: a flange 110 configured to fix the physical quantity measurement device 100 to a wall of an intake body that is the main passage 202; an external connection portion 120 having a connector that protrudes from the flange 110 and is configured to perform electrical connection with an external device; a measurement unit 130 protruding from the flange 110 toward the center of the main passage 202 and extending in a direction orthogonal to a main flow direction of the gas G to be measured flowing through the main passage 202.

For example, the flange 110 is fixed to the wall of the main passage 202 by a fastening member such as a bolt, and the housing 101 is arranged to protrude from the wall of the main passage 202 toward the inside of the main passage 202 as the measurement unit 130 is inserted into the opening portion provided in the wall of the main passage 202. The protruding direction of the housing 101 toward the inside of the main passage 202 is, for example, a direction from the wall of the main passage 202 toward the center of the main passage 202, and is a radial direction of the main passage 202. Further, the protruding direction of the housing 101 is, for example, a direction intersecting with the main flow direction of the gas G to be measured flowing through the main passage 202, and is the direction orthogonal to the main flow direction of the gas G to be measured.

The external connection portion 120 of the housing 101 has a connector 121 is provided on an upper surface of the flange 110 and protrudes from the flange 110 toward the downstream side in the main flow direction of the gas G to be measured as illustrated in FIG. 3. The connector 121 is provided with an insertion hole 121a configured to allow a communication cable for connection with the control device 220 to be inserted therethrough. In the insertion hole 121a, for example, four external terminals 122 are provided. The external terminals 122 serve as a terminal to output information on the physical quantity as the measurement result of the physical quantity measurement device 100 and a power supply terminal to supply DC power for the operation of the physical quantity measurement device 100.

As illustrated in FIG. 4, the printed circuit board 140, which is a circuit board, is integrally molded with the measurement unit 130 by insert-molding in the housing 101. The printed circuit board 140 is molded integrally with the housing 101 by insert-molding of arranging the printed circuit board 140 in advance in a mold for forming the housing 101 and molding the housing 101. The printed circuit board 140 is provided with at least one measurement unit configured to measure the physical quantity of the gas G to be measured flowing through the main passage 202 and a circuit unit configured to process a signal measured by the measurement unit. The measurement unit is arranged at a position to be exposed to the gas G to be measured, and the circuit unit is arranged in a circuit chamber sealed by the front cover 102. Incidentally, the insert-molding has been described as an example of a method of fixing the printed circuit board 140 in the present embodiment, but the invention is not limited thereto, and the printed circuit board 140 may be fixed to the housing 101 with an adhesive or the like.

As illustrated in FIGS. 2 and 4, the measurement unit 130 of the housing 101 has a substantially rectangular outer shape with the main flow direction of the gas G to be measured as the lateral direction and the protruding direction of the housing 101 as the longitudinal direction when viewed from a direction orthogonal to the main flow direction of the gas G to be measured and the protruding direction of the housing 101. Further, as illustrated in FIG. 3, the measurement unit 130 of the housing 101 has an elongated rectangular outer shape with the protruding direction of the housing 101 as the longitudinal direction when viewed from a direction parallel with the main flow direction of the gas G to be measured and orthogonal to the protruding direction of the housing 101.

In FIG. 3, the direction orthogonal to the main flow direction of the gas G to be measured and the protruding direction of the housing 101 is the thickness direction of the measurement unit 130. That is, the measurement unit 130 of the housing 101 has a rectangular plate-like outer shape with the main flow direction of the gas G to be measured as the lateral direction and the protruding direction of the housing 101 as the longitudinal direction, and the thin rectangular plate-like front cover 102 and rear cover 103 are arranged on the front surface and the rear surface in the thickness direction, respectively.

Auxiliary passage grooves are provided on the front and rear surfaces of the measurement unit 130. The auxiliary passage grooves of the measurement unit 130 form a first auxiliary passage 131 illustrated in FIGS. 4 and 5 together with the front cover 102 and the rear cover 103. A first auxiliary passage inlet 131a, configured to cause a part of the gas G to be measured, such as the intake air IG, to be taken into the first auxiliary passage 131, and a first auxiliary passage outlet 131b, configured to cause the gas G to be measured to return to the main passage 202 from the first auxiliary passage 131, are provided at a distal end of the measurement unit 130. A part of the printed circuit board 140 protrudes in the middle of the passage of the first auxiliary passage 131. A flow rate measurement unit 141 is arranged on a protruding portion of the printed circuit board 140. The flow rate measurement unit 141 is a measuring element that measures a flow rate that is the physical quantity of the gas G to be measured.

A second auxiliary passage 132, configured to cause a part of the gas G to be measured, such as the intake air IG, to be taken into a sensor chamber, is provided at a middle portion of the measurement unit 130 closer to the flange 110 than the first auxiliary passage 131. The second auxiliary passage 132 is formed by the measurement unit 130 and the rear cover 103. The second auxiliary passage 132 has a second auxiliary passage inlet 132a configured to take in the gas G to be measured and a second auxiliary passage outlet 132b configured to return the gas G to be measured to the main passage 202 from the second auxiliary passage 132. The second auxiliary passage 132 communicates with a sensor chamber Rs formed on the back side of the measurement unit 130, that is, on the rear surface side. In the sensor chamber Rs, pressure sensors 142A and 142B and a humidity sensor 143 provided on the rear surface of the printed circuit board 140 are arranged.

Auxiliary passage grooves configured to mold the first auxiliary passage 131 are provided on the distal end side in the protruding direction of the measurement unit 130, that is, in the longitudinal direction. The auxiliary passage grooves configured to form the first auxiliary passage 131 have a front auxiliary passage groove 131F illustrated in FIG. 4 and a rear auxiliary passage groove 131R illustrated in FIG. 5. As illustrated in FIG. 4, the front auxiliary passage groove 131F is gradually curved toward the flange 110 on the proximal end side of the measurement unit 130 as proceeding from the first auxiliary passage outlet 131b open at a downstream outer wall 133 of the measurement unit 130 toward an upstream outer wall 134, and communicates with an opening portion 135, which penetrates through the measurement unit 130 in the thickness direction, at a position near the upstream outer wall 134. The opening portion 135 is formed along the flow direction of the gas G to be measured in the main passage 124 so as to extend over a portion between the upstream outer wall 134 and the downstream outer wall 133.

As illustrated in FIG. 5, the rear auxiliary passage groove 131R proceeds from the upstream outer wall 134 toward the downstream outer wall 133, and is bifurcated at a middle position between the upstream outer wall 134 and the downstream outer wall 133. One of the bifurcated rear auxiliary passage grooves 131R extends directly in a straight line as a discharge passage and is open at an outlet 131c of the downstream outer wall 133. The other of the bifurcated rear auxiliary passage grooves 131R is gradually curved toward the flange 110 on the proximal end side of the measurement unit 130 as proceeding toward the downstream outer wall 133, and communicates with the opening portion 135 at a position near the downstream outer wall 133.

The rear auxiliary passage groove 131R forms an inlet groove through which the gas G to be measured flows from the main passage 202, and the front auxiliary passage groove 131F forms an outlet groove which causes the gas G to be measured taken from the rear auxiliary passage groove 131R to return to the main passage 202. That is, a part of the gas G to be measured flowing through the main passage 202 is taken into the rear auxiliary passage groove 131R from the first auxiliary passage inlet 131a and flows inside the rear auxiliary passage groove 131R as illustrated in FIG. 5. Further, a substance with a large mass contained in the gas G to be measured directly flows into the discharge passage extending in the straight line along with the part of the gas G to be measured from the branch, and is discharged to the main passage 202 through the outlet 131c of the downstream outer wall 133.

The rear auxiliary passage groove 131R has a shape of deepening in a progressing direction, and the gas G to be measured gradually moves to the front side of the measurement unit 130 as flowing along the rear auxiliary passage groove 131R. In particular, the rear auxiliary passage groove 131R is provided with an abruptly inclined portion 131d, which is abruptly deepened in front of the opening portion 135, and a part of air with a small mass moves along the abruptly inclined portion 131d and flows on a measurement surface 140a side of the printed circuit board 140 inside the opening portion 135. On the other hand, the substance with a large mass flows on a rear surface 140b side of the measurement surface 140a since an abrupt route change thereof is difficult.

As illustrated in FIG. 4, the gas G to be measured moving to the front side at the opening portion 135 flows along the measurement surface 140a of the printed circuit board 140, heat transfer is performed with the flow rate measurement unit 141 provided on the measurement surface 140a, so that the flow rate is measured. The air flowing into the front auxiliary passage groove 131F from the opening portion 135 flows along the front auxiliary passage groove 131F together with the gas, and is discharged to the main passage 202 through the first auxiliary passage outlet 131b open at the downstream outer wall 133.

The second auxiliary passage 132 is formed in a straight line over a portion between the second auxiliary passage inlet 132a and the second auxiliary passage outlet 132b in parallel with the flange 110 so as to be along the main flow direction of the gas G to be measured flowing through the main passage 124. The second auxiliary passage inlet 132a is formed by cutting out a part of the upstream outer wall 134, and the second auxiliary passage outlet 132b is formed by cutting out a part of the downstream outer wall 133. The second auxiliary passage inlet 132a and the second auxiliary passage outlet 132b are cut out up to a depth position to be flush with the rear surface 140b of the printed circuit board 140.

The second auxiliary passage 132 functions as a cooling channel which cools the printed circuit board 140 since the gas G to be measured passes along the rear surface 140b of the printed circuit board 140. A sensor chamber Rs is provided closer to the proximal end of the measurement unit 130 than the second auxiliary passage 132. A part of the gas G to be measured flowing into the second auxiliary passage 132 from the second auxiliary passage inlet 132a flows into the sensor chamber Rs, and pressure and relative humidity are measured by the pressure sensors 142A and 142B and the humidity sensor 143, respectively, inside the sensor chamber Rs. That is, the pressure sensors 142A and 142B and the humidity sensor 143 are measuring elements that respectively measure the pressure and the relative humidity, which are physical quantities of the gas G to be measured.

The printed circuit board 140 is integrally molded with the housing 101 such that, for example, the flow rate measurement unit 141 of the printed circuit board 140 is arranged at the opening portion 135 which is a connection portion between the front auxiliary passage groove 131F and the rear auxiliary passage groove 131R. In the measurement unit 130 of the housing 101, portions which embed a circumferential edge of the printed circuit board 140 by resin molding to be fixed to the housing 101 are provided as fixing portions 136 and 137. The fixing portions 136 and 137 include and fix the circumferential edge of the printed circuit board 140 so as to sandwich the circumferential edge from the front side and the back side. Further, a part of the printed circuit board 140 is fixed by a partition wall 138 that partitions between a circuit chamber Rc of the measurement unit 130 and the first auxiliary passage 131 similarly to the fixing portions 136 and 137.

The printed circuit board 140 has a temperature measurement unit 144 at the center of an upstream edge of the gas G to be measured. The temperature measurement unit 144 is one of measuring elements configured to measure the physical quantities of the gas G to be measured flowing through the main passage 202, and is mounted on the printed circuit board 140. The printed circuit board 140 includes a protruding portion 145, which protrudes from the second auxiliary passage inlet 132a of the second auxiliary passage 132 toward the upstream side of the gas G to be measured, and the temperature measurement unit 144 includes a chip-type temperature sensor 146 provided in the protruding portion 450 on the rear surface of the circuit board 400. The temperature sensor 146 and a wiring portion thereof are coated with a synthetic resin material so as to prevent electric corrosion caused by adhesion of salt water.

The second auxiliary passage inlet 132a is formed on the downstream side of the temperature measurement unit 144. For this reason, the gas G to be measured flowing into the second auxiliary passage 132 from the second auxiliary passage inlet 132a flows into the second auxiliary passage inlet 132a after coming into contact with the temperature measurement unit 144, and the temperature is measured when the gas G to be measured comes into contact with the temperature measurement unit 144. The gas G to be measured coming into contact with the temperature measurement unit 144 directly flows into the second auxiliary passage 132 from the second auxiliary passage inlet 132*a*, passes through the second auxiliary passage 132, and is discharged from the second auxiliary passage outlet 132*b* to the main passage 202.

Figure 6A:
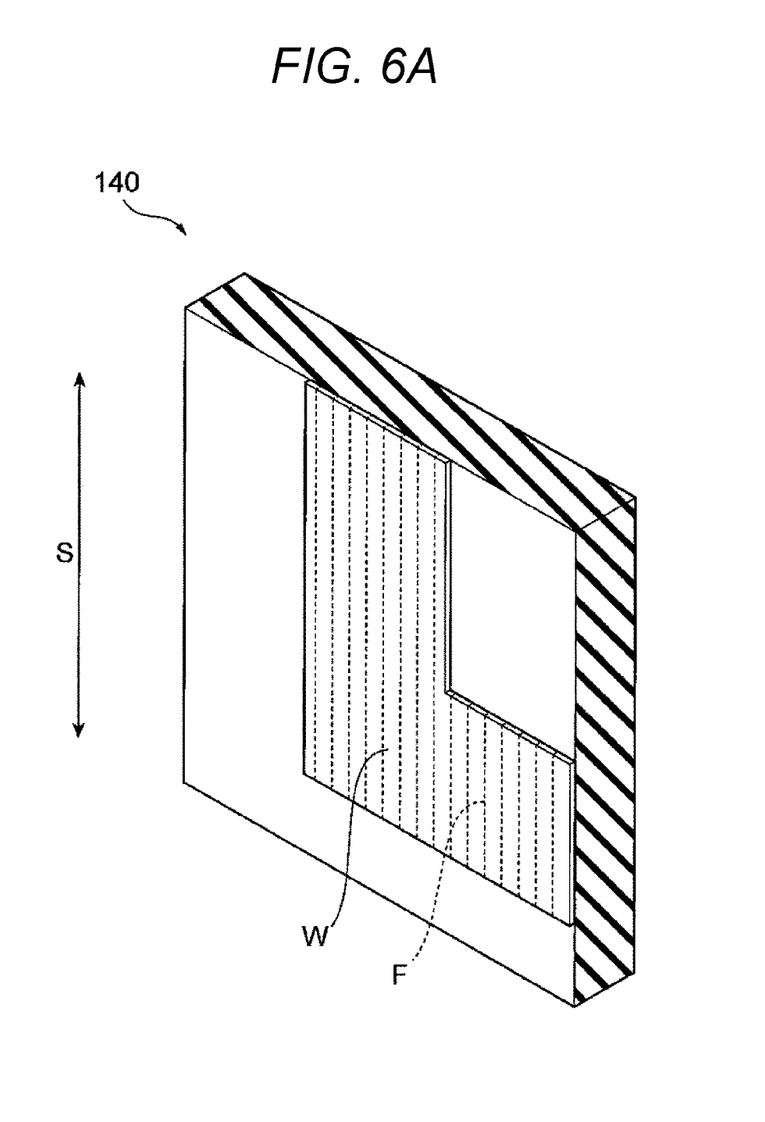
FIG. 6A is a schematic enlarged perspective view in which a printed circuit board of the physical quantity measurement device illustrated in FIG. 4 is cut.
Figure 6B:
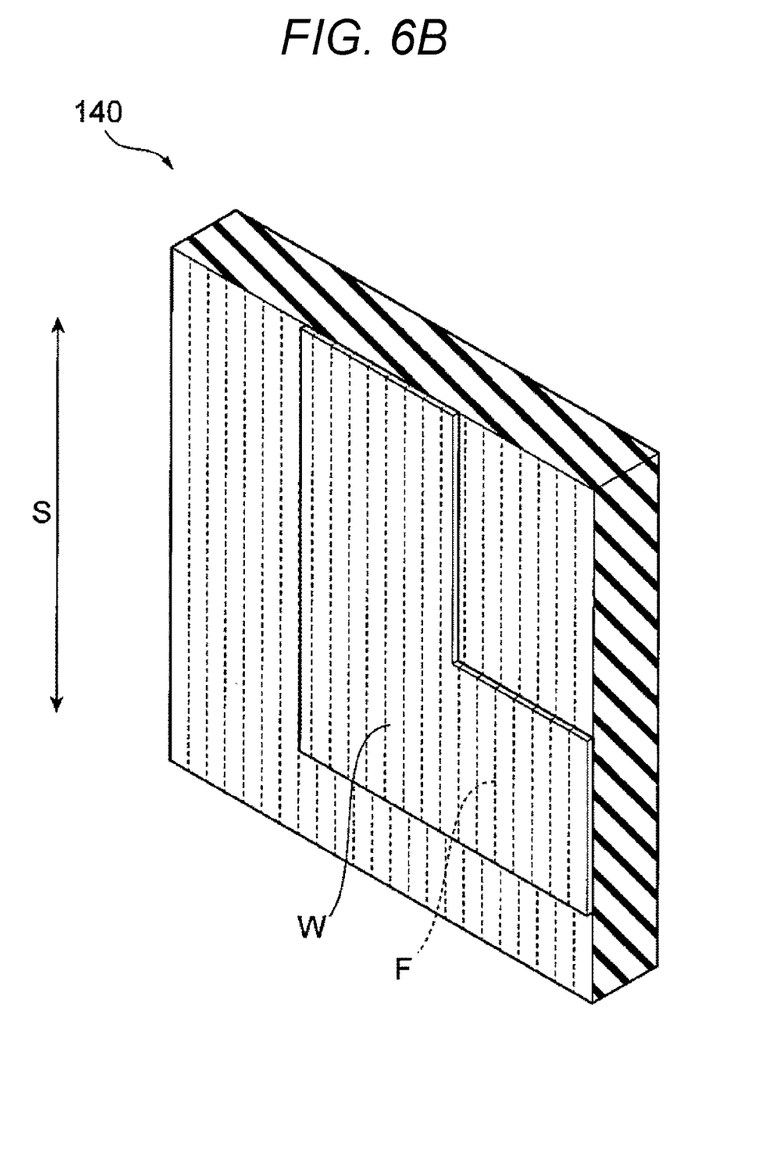
FIG. 6B is a schematic enlarged perspective view in which the printed circuit board of the physical quantity measurement device illustrated in FIG. 4 is cut.

FIGS. 6A and 6B are schematic enlarged perspective views in which a part of the printed circuit board 140 is cut. Incidentally, FIGS. 6A and 6B do not illustrate a solder resist formed on the surface of the printed circuit board 140. FIG. 6A illustrates an example in which a base material of the printed circuit board 140 does not have the irregularities F, and FIG. 6B illustrates an example in which a base material of the printed circuit board 140 has the irregularities F. On the printed circuit board 140, for example, a wiring W such as a copper wiring is formed in a predetermined wiring pattern. The printed circuit board 140 has the plurality of irregularities F formed along one direction of the surface.

Such irregularities F on the wiring W of the printed circuit board 140 are formed by, for example, polishing for the purpose of finishing a surface of the wiring W and improving the adhesion to a resist. That is, the plurality of irregularities F along one direction of the surface of the printed circuit board 140 are polishing marks formed in one direction on the wiring W of the printed circuit board 140 by, for example, a buffing method. In the buffing method, the printed circuit board 140 is polished using a cylindrical polishing wheel. At this time, the printed circuit board 140 is set in a buffing device such that a rotation direction of the polishing wheel is the same as the protruding direction when the printed circuit board 140 is arranged in the housing 101 or is a direction along the protruding direction. Incidentally, the irregularities F formed on the wiring W is not limited to such polishing marks, and may be, for example, rolling marks of the wiring W. Further, there is a case where irregularities are formed on the base material of the printed circuit board 140 in order to improve the adhesion between the wiring W and the base material as illustrated in FIG. 6B, and these irregularities serve as the irregularities F of the wiring W in some cases.

In the physical quantity measurement device 100 of the present embodiment, the printed circuit board 140 is arranged such that the formation direction of the irregularities F is oriented along the protruding direction of the housing 101 toward the inside of the main passage 202. In other words, the printed circuit board 140 is fixed to the housing 101 such that the formation direction of the irregularities F is oriented along an insertion direction. That is, the formation direction of the irregularities F is, for example, parallel with the protruding direction of the housing 101. Alternatively, an angle between the formation direction of the irregularities F and the protruding direction of the housing 101 is less than 45[°]. Incidentally, the angle between the formation direction of the irregularities F and the protruding direction of the housing 101 is preferably 10[°] or less from the viewpoint of improving the durability and reliability of the physical quantity measurement device 100.

Incidentally, the protruding direction of the housing 101 toward the inside of the main passage 202 is, for example, the direction from the wall of the main passage 202 toward the center of the main passage 202, and is the radial direction of the main passage 202 as described above. In other words, the protruding direction of the housing 101 is the direction from the flange 110 to a bottom of a neck (the side inserted into the main passage). Further, the protruding direction of the housing 101 toward the inside of the main passage 202 is, for example, the direction intersecting with the main flow direction of the gas G to be measured flowing through the main passage 202, and is the direction orthogonal to the main flow direction of the gas G to be measured. Further, when the measurement unit 130 of the housing 101 inserted into the main passage 202 has the rectangular plate-like shape as illustrated in FIGS. 1 to 5, the protruding direction of the housing 101 toward the inside of the main passage 202 is the longitudinal direction of the measurement unit 130.

Hereinafter, action of the physical quantity measurement device 100 of the present embodiment will be described.

As described above, the physical quantity measurement device 100 of the present embodiment can measure the physical quantities of the gas G to be measured, which is the intake air IG flowing through the main passage 202, by the flow rate measurement unit 141 as the physical quantity measuring element mounted on the printed circuit board 140, the pressure sensors 142A and 142B, the humidity sensor 143, and the temperature measurement unit 144. Further, the physical quantity measurement device 100 can output the electric signals representing the measured physical quantities of the intake air IG to the control device 220 via the communication cable connected to the external connection portion 120.

Here, the physical quantity measurement device 100 of the present embodiment is supported by the wall of the main passage 202 in a cantilevered manner such that one end is the fixed end fixed to the wall of the main passage 202 and the other end is the free end arranged in the main passage 202 as described above. For this reason, for example, the flange 110 is fixed to the wall of the main passage 202 by a fastening member such as a bolt, and the housing 101 of the physical quantity measurement device 100 is arranged to protrude from the wall of the main passage 202 toward the inside of the main passage 202 as the measurement unit 130 is inserted into the opening portion provided in the wall of the main passage 202, as described above.

In such a state, when the main passage 202 vibrates due to the rotation of the internal combustion engine 210, for example, a vibration is applied to the housing 101, arranged so as to protrude from the wall of the main passage 202 toward the inside of the main passage 202, in a direction intersecting with the protruding direction of the housing 101. More specifically, as illustrated in FIGS. 2 to 5, the vibration is applied to the measurement unit 130 of the housing 101 having the substantially rectangular plate-like shape in the thickness direction of the measurement unit 130, that is, in the direction substantially orthogonal to the protruding direction of the housing 101 and the main flow direction of the gas G to be measured.

As a result, the vibration which is, for example, about 30 times (30 G) the gravitational acceleration is generated in the housing 101 of the physical quantity measurement device 100. Further, when resonance occurs, the response magnification becomes about 100 times, for example, and there is a possibility that vibration of about 3000 G at the maximum may be generated. When such a vibration is generated in the housing 101, high stress is repeatedly applied to the printed circuit board 140 which is insert-molded in the housing 101. As described above, when the measurement unit 130 of the housing 101 vibrates in the thickness direction, the high stress acts on the printed circuit board 140 in a stress direction S illustrated in FIGS. 2, 4, and 5. The stress direction S is, for example, substantially parallel with the protruding direction of the housing 101 toward the inside of the main passage 202.

For this reason, there is a possibility that the stress is concentrated on the irregularities F so that the wiring W is broken or the durability of the printed circuit board 140 deteriorates when the formation direction of the plurality of irregularities F formed in one direction along the surface of the printed circuit board 140 is, for example, orthogonal to the stress direction S or intersects with the stress direction S with an angle of 45[°] or more.

In this regard, the physical quantity measurement device 100 of the present embodiment is the device that measures the physical quantity of the gas G to be measured flowing through the main passage 202 and includes the housing 101 arranged so as to protrude from the wall of the main passage 202 toward the inside of the main passage 202 and the printed circuit board 140 which is insert-molded in the housing 101 and on which the measuring element that measures the physical quantity is mounted as described above. Further, the printed circuit board 104 has the plurality of irregularities F formed along one direction of the surface, and is arranged such that the formation direction of the irregularities F is oriented along the protruding direction of the housing 101 toward the inside of the main passage 202.

With this configuration, the physical quantity measurement device 100 of the present embodiment can suppress the breakage of the wiring W since the stress concentration on the irregularities F of the printed circuit board 140 is suppressed, and can improve the durability of the printed circuit board 140 when the vibration of the housing 101 is generated. Therefore, the reliability of the physical quantity measurement device 100 can be improved according to the present embodiment.

Figure 7:
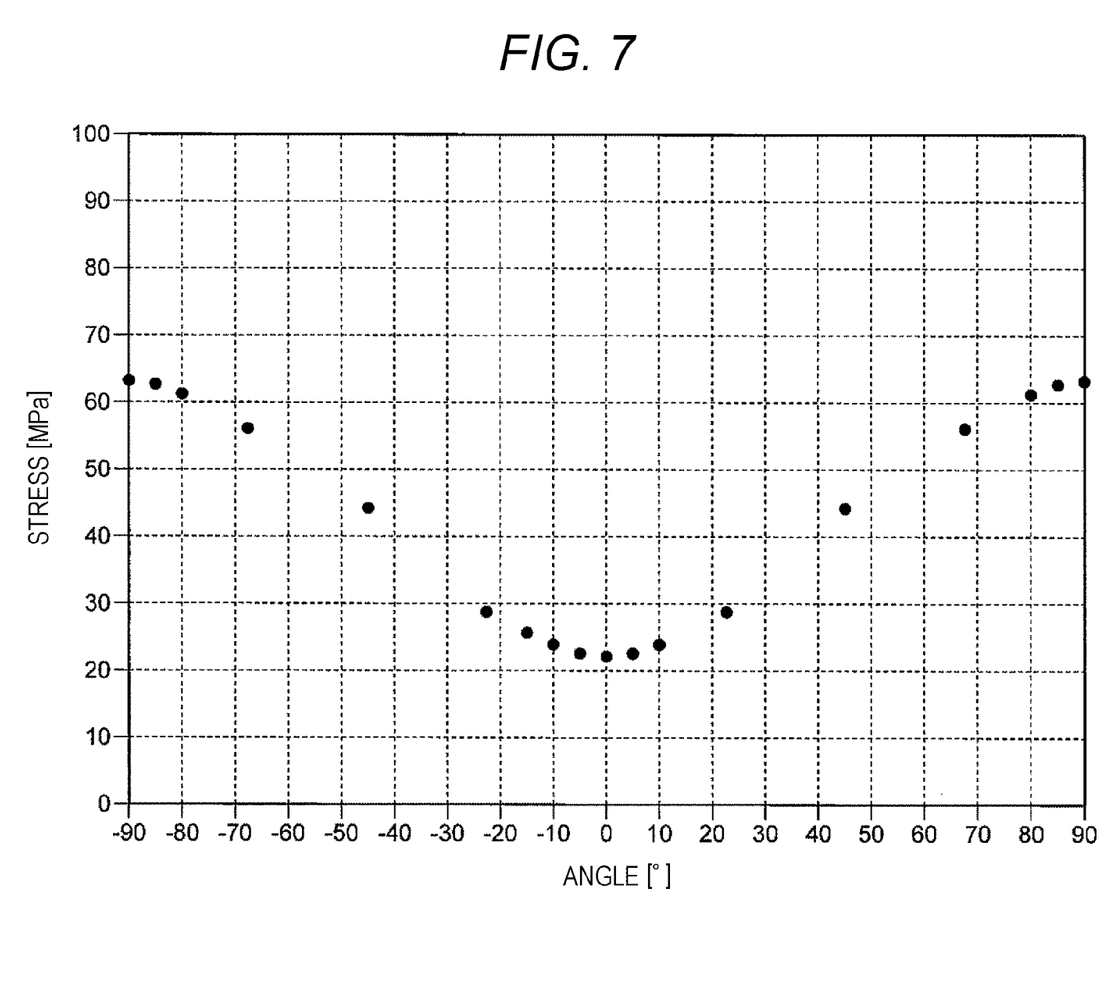
FIG. 7 is a graph illustrating an example of a relationship between an angle between a formation direction of irregularities of the printed circuit board illustrated in FIGS. 6A and 6B and a protruding direction of a housing, and stress acting on the irregularities.

FIG. 7 is a graph illustrating an example of a relationship between angle [°] between the formation direction of the irregularities F of the printed circuit board 140 and the protruding direction of the housing 101 (that is, the stress direction S), and the stress [MPa] acting on the irregularities F. In this example, when the angle between the formation direction of the irregularities F and the protruding direction of the housing 101 is −90[°] and 90[°], that is, when the formation direction of the irregularities F is orthogonal to the protruding direction of the housing 101, the stress acting on the irregularities F has a maximum value of about 63 [MPa].

On the other hand, when the formation direction of the irregularities F is oriented along the protruding direction of the housing 101, that is, when the angle between the formation direction of the irregularities F and the protruding direction of the housing 101 is less than 45°, the stress acting on the irregularities F can be reduced by 30% or more to be less than about 44 [MPa]. Further, when the angle between the formation direction of the irregularities F and the protruding direction of the housing 101 is 10° or less, the stress acting on the irregularities F can be reduced by 63% or more to be about 23 [MPa] or less. In particular, when the angle between the formation direction of the irregularities F and the protruding direction of the housing 101 is 0[°], that is, when the formation direction of the irregularities F is parallel with the protruding direction of the housing 101, the stress acting on the irregularities F can be reduced to the minimum value of about 22 [MPa].

As described above, the breakage of the wiring W of the printed circuit board 140 can be suppressed in the physical quantity measurement device 100 using the printed circuit board 140 according to the present embodiment. Although the embodiment of the present disclosure has been described in detail with reference to the drawings as above, a specific configuration is not limited to the embodiment, and design alterations or the like made in a scope not departing from a gist of the present disclosure is included in the present disclosure. Hereinafter, a modification of the above-described embodiment will be described.

Figure 8:
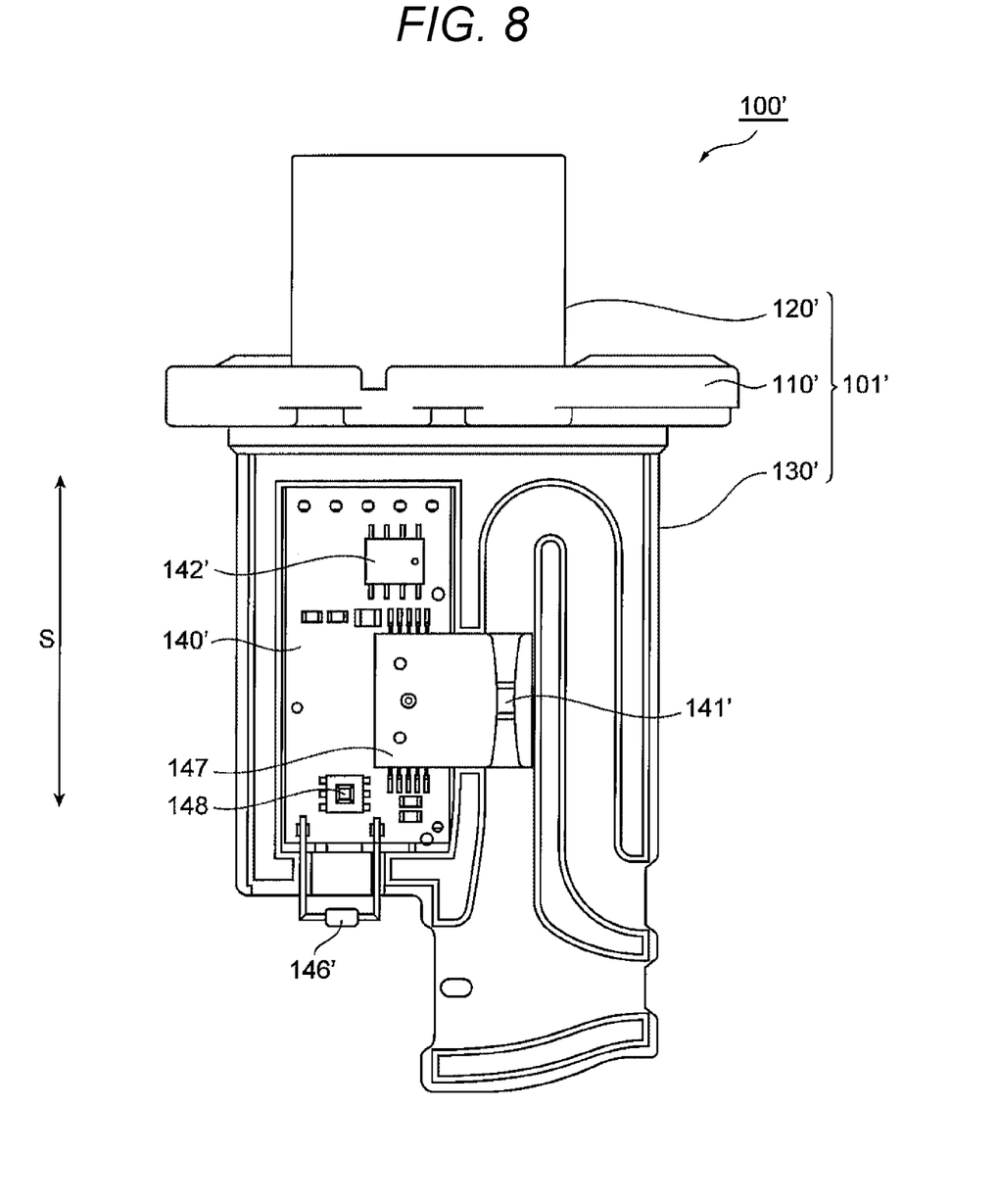
FIG. 8 is a front view corresponding to FIG. 4 of a physical quantity measurement device according to a modification.

FIG. 8 is a front view of a physical quantity measurement device 100' according to a modification, which corresponds to FIG. 4 of the physical quantity measurement device 100 according to the above-described embodiment. The physical quantity measurement device 100' is a device that measures a physical quantity of the gas G to be measured flowing through the main passage 202, which is similar to the physical quantity measurement device 100 according to the above-described embodiment.

The physical quantity measurement device 100' includes: a housing 101' arranged so as to protrude from a wall of the main passage 202 toward the inside of the main passage 202; and a printed circuit board 140' which enables measuring elements that measure physical quantities (a flow sensor 141', a pressure sensor 142', a temperature sensor 146', and a temperature/humidity sensor 148) to be mounted on the housing 101', which is similar to the physical quantity measurement device 100 according to the above-described embodiment. The printed circuit board 140' is fixed to the housing 101' with an adhesive or the like. Further, the printed circuit board 140' may be insert-fixed to the housing 101' similarly to the above-described embodiment. The measuring element is mounted on the printed circuit board 140' by fixing a resin package 147 to the printed circuit board 140'.

In the present modification, the resin package 147 is mounted on the printed circuit board 101'. The resin package 147 is formed such that the flow sensor 141' and a control circuit are mounted on a lead frame and sealed with a resin so as to expose at least a flow rate measurement unit (thin portion) of the flow sensor 141'. A lead terminal of the resin package 147 is electrically and mechanically connected to the printed circuit board 140' by soldering, welding, or the like. The measuring element is protected by the resin package 147, and the durability and reliability of the physical quantity measurement device 100' can be improved. Incidentally, a configuration in which the flow sensor 141' and the control circuit are integrated with the same semiconductor element may be employed. That is, the control circuit may be integrally formed with the measuring element.

The printed circuit board 140' has a plurality of irregularities F formed along one direction of a surface, and is arranged such that a formation direction of the irregularities F is oriented along the protruding direction (in other words, an insertion direction) of the housing 101' from the flange 110' toward the inside of the main passage 202. Therefore, according to the physical quantity measurement device 100' of the present modification, the same effects as those of the physical quantity measurement device 100 according to the above-described embodiment can be obtained.

Figure 9:
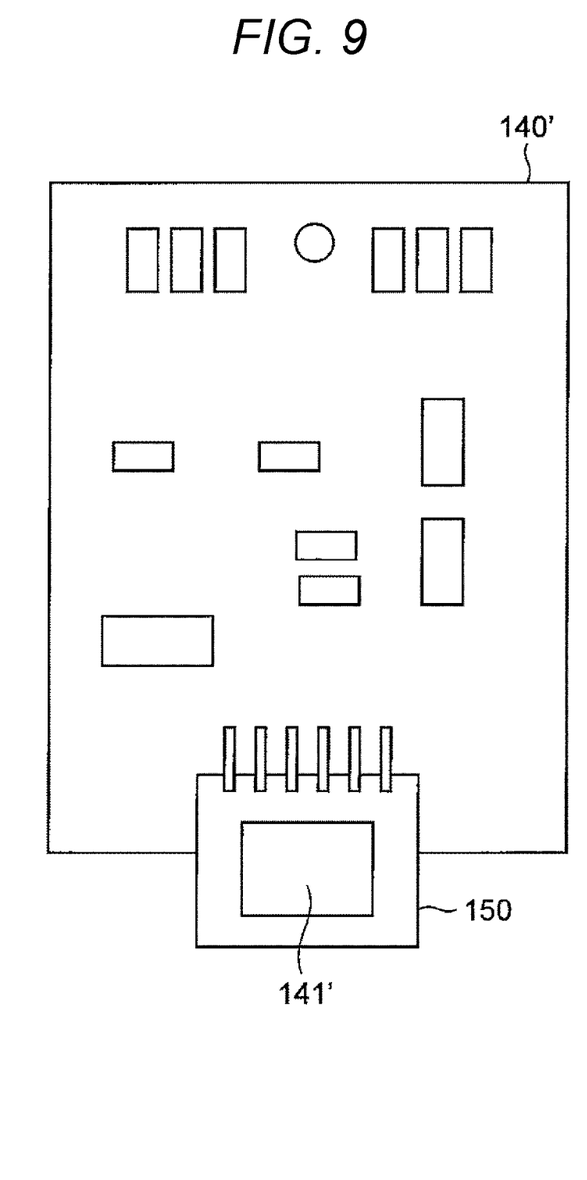
FIG. 9 is a plan view illustrating a modification of the printed circuit board of the physical quantity measurement device illustrated in FIG. 4.

FIG. 9 is a plan view illustrating a modification of the printed circuit board 140 of the physical quantity measurement device 100 illustrated in FIG. 4. The measuring elements including the flow rate measurement unit 141' may be mounted on the printed circuit board 140' via a support body 150 attached to the printed circuit board 140'. With this configuration, stress acting on the measuring elements can be reduced as compared with a case where the measuring elements including the flow rate measurement unit 141' are directly mounted on the printed circuit board 140', and the durability and reliability of the physical quantity measurement device 100 can be improved. Incidentally, to mount components on the printed circuit board 140' includes, for example, to attach the components to the printed circuit board 140' and to electrically connect the components to the wiring of the printed circuit board 140'. Examples of the support body 150 include a metal member such as a metal lead frame, an LTCC board, a printed circuit board, and the like on which an electric wiring can be formed. A hole or a projection for positioning with respect to the housing 101' may be formed on the support body 150, and a configuration in which positioning is performed using the positioning projection or hole formed in the housing 101' may be adopted.

REFERENCE SIGNS LIST

100 physical quantity measurement device
100' physical quantity measurement device
101 housing
101' housing
140 printed circuit board
140' printed circuit board
141 flow rate measurement unit (measuring element)
141' flow sensor (physical quantity measurement unit)
142A pressure sensor (measuring element)
142B pressure sensor (measuring element)
142' pressure sensor (measuring element)
143 humidity sensor (measuring element)
144 temperature measurement unit (measuring element)
146' temperature sensor (measuring element)
147 resin package
148 temperature/humidity sensor (measuring element)
150 support body
202 main passage
F irregularity
G gas to be measured
W wiring

The invention claimed is:

1. A physical quantity measurement device, which measures a physical quantity of a gas flowing through a main passage, comprising:
    a flange for fixing to the main passage;
    a housing provided so as to protrude toward an inside of the main passage from the flange; and
    a printed circuit board which is fixed to the housing and on which a measuring element that measures the physical quantity is mounted,
    wherein a wiring of the printed circuit board has a plurality of irregularities formed along one direction of a surface, and is arranged such that a formation direction of the irregularities is oriented along a protruding direction of the housing toward an inside of the main passage,
    wherein the irregularities are polishing marks formed using a cylindrical polishing wheel.

2. The physical quantity measurement device according to claim 1, wherein an angle between the formation direction of the irregularities and the protruding direction of the housing is 10° or less.

3. The physical quantity measurement device according to claim 1, further comprising a resin package that seals the measuring element in a state where a physical quantity measurement unit of the measuring element is exposed,
    wherein the measuring element is mounted on the printed circuit board by fixing the resin package to the printed circuit board.

4. The physical quantity measurement device according to claim 1, wherein the measuring element is mounted on the printed circuit board via a support body attached to the printed circuit board.

5. The physical quantity measurement device according to claim 4, wherein the support body is a metal member, and the measuring element is integrally formed with a control circuit.

6. The physical quantity measurement device according to claim 5 wherein a hole or a projection for positioning is formed on the support body.

7. A physical quantity measurement device, which measures a physical quantity of a gas flowing through a main passage, comprising:
    a flange for fixing to the main passage;
    a housing provided so as to protrude toward an inside of the main passage from the flange; and
    a printed circuit board which is fixed to the housing and on which a measuring element that measures the physical quantity is mounted,
    wherein a wiring of the printed circuit board has a plurality of irregularities formed along one direction of a surface, and is arranged such that a formation direction of the irregularities is oriented along a protruding direction of the housing toward an inside of the main passage,
    wherein the irregularities are rolling marks of the wiring of the printed circuit board.

8. The physical quantity measurement device according to claim 7, wherein an angle between the formation direction of the irregularities and the protruding direction of the housing is 10° or less.

9. The physical quantity measurement device according to claim 7, further comprising a resin package that seals the measuring element in a state where a physical quantity measurement unit of the measuring element is exposed,
    wherein the measuring element is mounted on the printed circuit board by fixing the resin package to the printed circuit board.

10. The physical quantity measurement device according to claim 7, wherein the measuring element is mounted on the printed circuit board via a support body attached to the printed circuit board.

11. The physical quantity measurement device according to claim 10, wherein the support body is a metal member, and the measuring element is integrally formed with a control circuit.

12. The physical quantity measurement device according to claim 11 wherein a hole or a projection for positioning is formed on the support body.

* * * * *